United States Patent
Wang et al.

(10) Patent No.: US 7,580,568 B1
(45) Date of Patent: Aug. 25, 2009

(54) METHODS AND SYSTEMS FOR IDENTIFYING AN IMAGE AS A REPRESENTATIVE IMAGE FOR AN ARTICLE

(75) Inventors: Niniane Wang, Santa Clara, CA (US); Stephen R. Lawrence, Mountain View, CA (US); Christopher M. Prince, Mountain View, CA (US)

(73) Assignee: Google Inc., Mountain View, CA (US)

( * ) Notice: Subject to any disclaimer, the term of this patent is extended or adjusted under 35 U.S.C. 154(b) by 944 days.

(21) Appl. No.: 10/813,818

(22) Filed: Mar. 31, 2004

(51) Int. Cl.
*G06K 9/34* (2006.01)
(52) U.S. Cl. ................... 382/173; 382/176
(58) Field of Classification Search ............... 382/173, 382/176; 707/2–4, 104.1; 715/501.1, 513
See application file for complete search history.

(56) References Cited

U.S. PATENT DOCUMENTS

| | | | |
|---|---|---|---|
| 6,006,222 | A | 12/1999 | Culliss |
| 6,014,665 | A | 1/2000 | Culliss |
| 6,078,916 | A | 6/2000 | Culliss |
| 6,182,068 | B1 | 1/2001 | Culliss |
| 6,380,983 | B1 * | 4/2002 | Miyazaki et al. ............. 348/554 |
| 6,456,307 | B1 * | 9/2002 | Bates et al. ................. 715/838 |
| 6,581,056 | B1 | 6/2003 | Rao |
| 6,816,847 | B1 * | 11/2004 | Toyama ........................ 706/14 |
| 2002/0038299 | A1 * | 3/2002 | Zernik et al. .................... 707/3 |
| 2002/0065841 | A1 * | 5/2002 | Matsuda et al. ............. 707/206 |
| 2002/0107847 | A1 * | 8/2002 | Johnson ......................... 707/3 |
| 2003/0167266 | A1 | 9/2003 | Saldanha et al. |
| 2004/0143569 | A1 | 7/2004 | Gross et al. |

OTHER PUBLICATIONS

Wynblatt et al. ("Web Page Caricatures: Multimedia Summaries for WWW Documents," Proc. IEEE Int'l Conf. Multimedia Computing and Systems, Jun. 22-Jul. 1, 1998, pp. 194-199).*
Archive of "Froogle," www.froogle.google.com, [online] [Archived by http://archive.com on Mar. 30, 2004; Retrieved on Oct. 20, 2006] Retrieved from the Internet<URL:http://web.archive.org/web/20040330045133/froogle.google.com>.
Archive of "Google News," www.news.google.com, [online] [Archived by http://archive.com on Mar. 25, 2004; Retrieved on Oct. 20, 2006] Retrieved from the Internet<URL:http://web.archive.org/web/20040325173400/http://www.news.google.com>.
U.S. Appl. No. 10/749,440, filed Dec. 31 2003, Badros et al.
80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.

(Continued)

*Primary Examiner*—Yubin Hung
(74) *Attorney, Agent, or Firm*—Fenwick & West LLP (57) ABSTRACT

Methods and systems that identify a representative image for an article are described. In one aspect of the invention, an article is received, an image data signal is determined for each image associated with the article, and a representative image based at least in part on an image data signal is determined.

44 Claims, 4 Drawing Sheets

OTHER PUBLICATIONS

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-techonologies.com/products/devonthink.php, printed Mar. 16, 2004.

dtSearch®—http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

\* cited by examiner

METHODS AND SYSTEMS FOR IDENTIFYING AN IMAGE AS A REPRESENTATIVE IMAGE FOR AN ARTICLE

FIELD OF THE INVENTION

The invention generally relates to search engines. More particularly, the invention relates to methods and systems for identifying an image as a representative image for an article.

BACKGROUND OF THE INVENTION

Conventional search applications operating in a networked computer environment such as the World Wide Web and client-device search applications operating in an individual computer can provide search results in response to entry of a user's search query. In many instances, the search results are ranked in accordance with the search application's scoring or ranking system or method. For example, conventional search applications score or rank articles of a search result for a particular query by the number of times a keyword or particular word or phrase appears in each article in the search results. Users generate and access a large number of articles, such as e-mails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

If a search application returns more than one search result in response to a search query, the search results may be displayed as a list of article identifiers associated with the search results. An article identifier may be, for example, a Uniform Resource Locator (URL), a file name, a link, an icon, a path for a local file, or anything else that identifies an article. A user may browse and visit a web page associated with one or more of the search results to evaluate whether the web page is relevant to the user's search query. For example, a user may manipulate a mouse or another input device and "click" on an article identifier to view a web page associated with the search result. In many instances, the user will browse and visit several web pages provided in the search result, clicking on article identifiers associated with each of the several web pages to access various web pages associated with the search results before locating useful or relevant information to address the user's search query.

In order to utilize a particular search result, a user must select the search result from a single set of search results provided in response to a user's initial search query. When the user selects the search result, the user then views the search result and determines whether the search result is useful or relevant to the initial search query. Article identifiers provided in a search result typically include a Uniform Resource Locator (URL), a file name, a link, an icon, and a path for a local file. In many instances, the user is unfamiliar with the search result and the article identifier provided is not helpful in initially determining whether the search result is useful or relevant to the initial search query. In these instances, the user either selects the particular search result to view the search result, or the user decides to ignore the search result. Clicking on multiple links to multiple websites associated with a single set of search results can be time consuming.

SUMMARY OF THE INVENTION

Embodiments of the present invention comprise methods and systems that identify a representative image for an article. In one aspect of the invention, an article is received, an image data signal is determined for an image associated with the article, and a representative image based at least in part on image data signal is determined. A number of variables using image data may be applied in such systems and methods.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
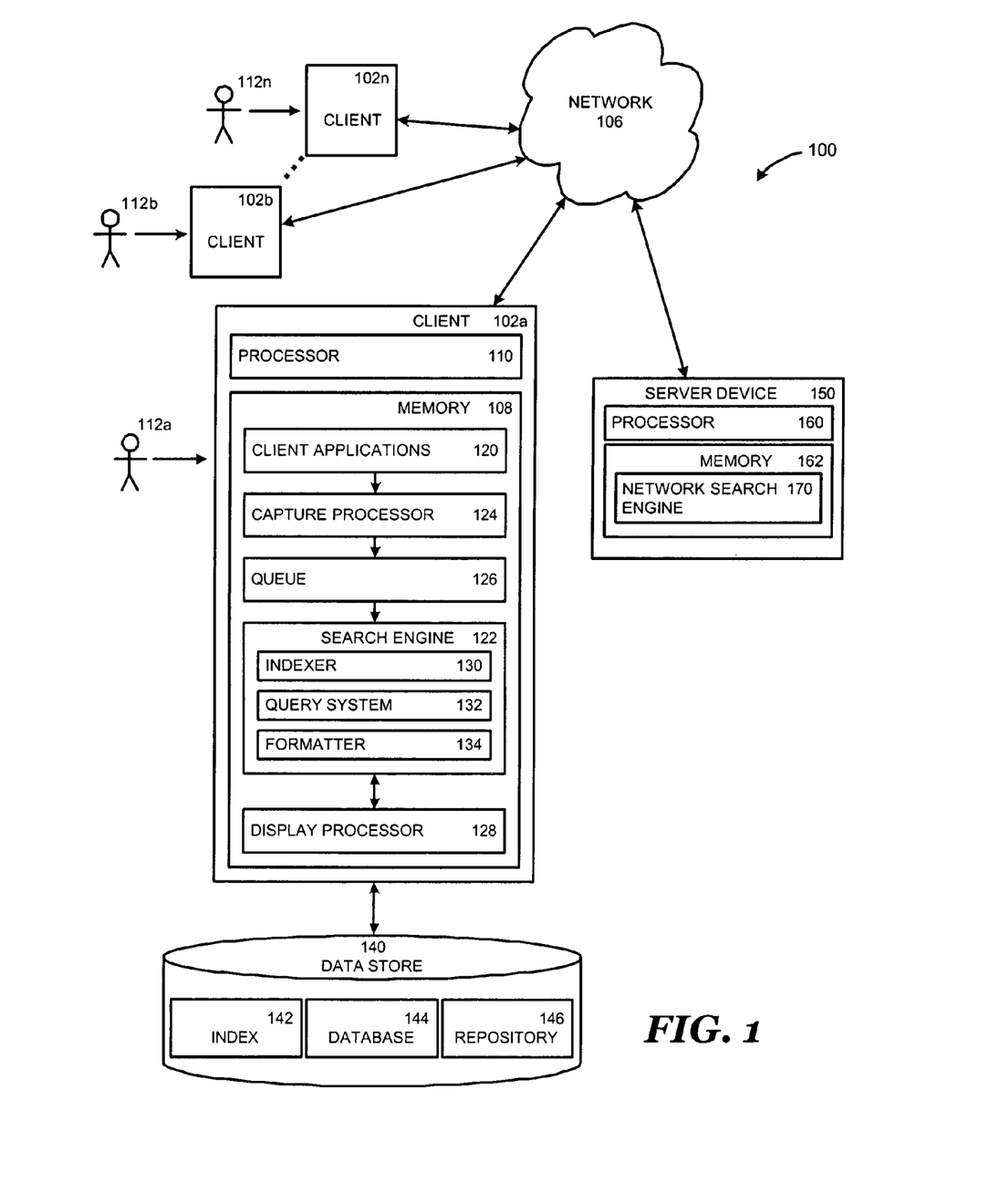
FIG. 1 illustrates a block diagram of a system in accordance with one embodiment of the present invention.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a shown can comprise a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, e-mails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an e-mail or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine 122 receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or conversion facilitating data exchange, and can include, for example, any one of the following communication mechanisms: Extensible Markup Language-Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and extracting event data associated with an event. Examples of events include sending or receiving an e-mail message, a user viewing a web page, saving a word processing document, printing a spreadsheet document, inputting text to compose or edit an e-mail, opening a presentation application, closing an instant messenger application, entering a keystroke, moving the mouse, and hovering the mouse over a hyperlink. An example of event data captured by the capture processor 124 for an event involving the viewing of a web page by a user can comprise the URL of the web page, the time and date the user viewed the web page, the content of the web page in original or processed forms, a screenshot of the page as displayed to the user, a thumbnail version of the screenshot, and image data associated with the web page. An example of event data captured by the capture processor 124 for an event involving receipt of an e-mail message by the user 112a can comprise the sender of the message, the recipients of the message, the time and date the message was received, the content of the message, and a conversation ID. A conversation ID can be used to associate messages that form a conversation and can be provided by the instant messenger application or can be generated by the capture processor 124. A conversation can be one or more messages between the user 112a and at least one other user until the user 112a logs out of or closes the instant messenger application or the instant messenger application is inactive for a certain period of time (for example, 30 minutes).

In the embodiment shown, the capture processor 124 comprises multiple capture components. For example, the capture processor 124 shown in FIG. 1 comprises a separate capture component for each client application in order to capture events associated with each application. The capture processor 124 shown also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger event sent by a user 112*a* can include a recipient or list of recipients, the time sent, the date sent, content of the message, and a conversation ID. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. An event schema can also contain lists of information, such as, for example, multiple recipient fields from an e-mail. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable." In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or e-mail. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an e-mail or pasting a sentence in a word processing document, closing an article, such as closing an instant messenger window or changing an e-mail message being viewed, loading, saving, opening, or viewing an article, such as a word processing document, web page, or e-mail, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, spreadsheet documents, the emails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an e-mail application, to retrieve articles and other associated information. For example, the capture processor 124 can request that the web browser application obtain all viewed web pages by the user or request that the e-mail application obtain all e-mail messages associated with the user. These articles may not currently exist in memory 108 or on a storage device of the client device 102*a*. For example, the e-mail application may have to retrieve e-mails from a server device. In one embodiment, the search engine 122 indexes historical events.

In the embodiment shown in FIG. 1, events captured by the capture processor 124 are sent to the queue 126 in the form of an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126, or how detailed the events are that are sent (fewer or smaller events when the system is busy), or how frequently events are sent (events are sent less often when the system is busy or there are too many events waiting to be processed).

The search engine 122 can use performance data to determine when it indexes various events and when and how often it issues implicit queries.

In one embodiment, the queue 126 holds the events and performance data until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a two- or three-priority queue where higher priority events are served before lower priority events, and other components may be able to specify the type of events they are interested in. Generally, real-time events can be given higher priority than historical events, and indexable events can be given higher priority than non-indexable real time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language-Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 shown contains an indexer 130, a query system 132, and a formatter 134. The query system 132 can retrieve all real-time events and performance data from the queue 126. The query system 132 can use performance data and real-time events to update the current user state and generate an implicit query. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown, the data store comprises an index 142, a database 144 and a repository 146.

In one embodiment, when the indexer 130 receives an event, the indexer 130 can determine, from the event, terms (if any) associated with the event, location information associated with the event (if available), the time of the event (if available), images (if any) associated with the event, and/or any other information defining the event. The indexer 130 can also determine if the event relates to other events and associate the event with related events. For example, for a received instant messenger message event, the indexer can associate the message event with other message events from the same conversation. The messages from the same conversation can be associated with each other in a conversation object, which can be stored in the data store 140.

The indexer 130 can send and incorporate terms, locations, and times associated with the event in the index 142 of the data store 140. The event can be sent to the database 144 for storage and the content of the associated article and any associated images can be stored in the repository 146. The conversation object associated with email messages can be stored in the database 144. The indexer 130 can extract the best representative image for an article associated with the event or can extract all images for an article associated with the event. The images are stored in the repository 146.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's e-mails, word processing documents, and instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 formats the results in XML, HTML, or tab delineated text. In another embodiment, the formatter 134 can include a representative image, thumbnail image, or small image file with each result for output to a display processor 128. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including, for example, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 shown includes a server executing a search engine application program, such as the Google™ search engine. In other embodiments, the server device 150 can comprise a related information server or an advertising server. Similar to the client devices 102a-n, the server device 150 shown can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 can then provide the result set to the client device 102a via the network 106. The result set can comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article. In the embodiment shown, an article identifier comprises a URL associated with an article. In another embodiment, the article identifier comprises a representative image, thumbnail image, or small image file for each article.

In one embodiment, the server device 150, or related device, has previously performed a crawl of the network 106 to locate articles, such as web pages, stored at other devices or systems connected to the network 106, and indexed the articles in memory 162 or on another data storage device.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIGS. 2 through 4.

Various methods in accordance with embodiments of the present invention may be carried out. For example, in one embodiment a search engine receives an article, determines an image data signal for an image associated with the article, and determines a representative image based at least in part on an image data signal.

Figure 2:
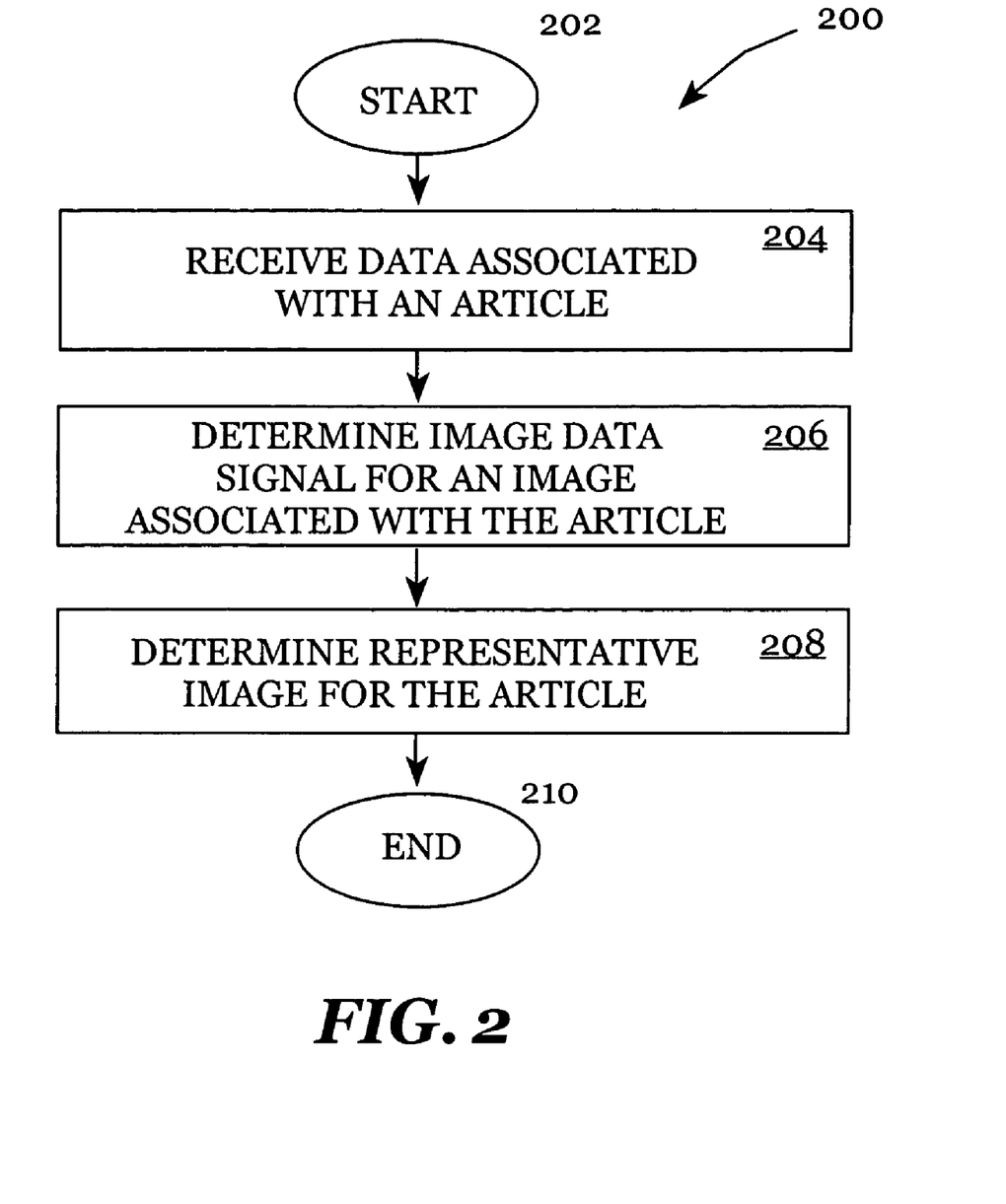
FIG. 2 illustrates a flow diagram of a method in accordance with one embodiment of the present invention.

FIG. 2 illustrates an exemplary method 200 that provides a method for identifying an image as a representative image for an article. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In block 202, the method 200 begins. Block 202 is followed by block 204, in which data associated with an article is received. This may be accomplished by, for example, retrieving, accessing, or otherwise obtaining an article and associated article data via a network 106 such as the Internet, or from a client device 102a. As described with reference to FIG. 1, the capture processor 124 captures an event, which contains an associated article and article data. For example, the capture processor 124 receives article data associated with an article that is accessed by a client application 120 such as a document associated with a word processing application program. In another example, the capture processor 124 receives article data for an article related to or otherwise linked to an article of interest such as a document associated with a word processing application program. By way of another example, the indexer 130 can also receive article data when the capture processor 124 transmits an event, such as the user 112a operating client device 102a to access a web page through a network 106, to the indexer 130 via the queue 126. In yet another example, a search engine 122 or a network search engine 170 receives article data associated with articles in a result set as a response to an explicit search query such as relevant information previously stored in a data store 140, database 144, memory 108, network 106, server 150, or a client 102a-n.

Block 204 is followed by subroutine 206, in which an image data signal for an image associated with the article is determined. As described above in block 204, the indexer 130 receives article data associated with an event. Accordingly, the capture processor 124 can also determine article data from articles such as web pages. In some embodiments, network search engine 170 can receive article data. In each of these instances, the respective component determines image data from the article data, such as determining the number of images in an article of interest. Image data can also include for each image, but is not limited to, pixel values of the image, file extension name, file type, file name, file size, image dimensions, image aspect ratio, image frequency over multiple articles, location of image within an article, data adjacent to image, whether the image is associated with submitting a form, image caption, text adjacent to image, color distribution in image, text in links to the image from other pages, text nearby links to the image from other pages, headings and other text in pages that link to the image, number of colors in image, one or more other ranking factors or scores based on an image and/or article, and one or more other ranking factors or scores based on an image and/or article under consideration, or other similar factors or scores.

From the example provided above in block 204, the indexer 130 determines that article data from a web page being viewed by the user has five images, for example. Greater or fewer images can be associated with a particular article or web page.

Furthermore, in the embodiment shown in FIG. 2, the indexer 130 generates an image data signal for an image of the article of interest. For the example provided above, a respective image data signal may be determined for each of the five images identified in the article of interest determined in block 204. The image data signal can comprise various image data that can be determined for an image. Image data in this example can include any of the various examples of image data described above.

In another example from above, article data is received for an article related to or otherwise linked to an article of interest such as an image in a document linked to an article of interest.

An image data signal for the image is determined. The image data signal can comprise various image data that can be determined for an image such as any of the various examples described above.

Subroutine 206 is followed by subroutine 208, in which a representative image for the article is based at least in part on an image data signal is determined. For example, based on an image data signal from an image of the article of interest or of an article related to the article of interest, the indexer 130 shown in FIG. 1 would determine a representative image for an article of interest. This representative image would comprise the determined image data for a particular article. The representative image may include additional article data immediately adjacent to the image in the article, such as, in one exemplary embodiment, a 100 pixel-wide border immediately adjacent to each side of the image. This may be obtained by determining the location of the selected image within a client application window and taking a screenshot of the region nearby the image. Other article content can also comprise the representative image.

In the embodiment shown, the image data signal can be used to determine an image data score. The image data score is calculated using an image data scoring function. The image data scoring function may comprise an algorithm for calculating the image data score based on one or more variables. The image data scoring function in the embodiment shown comprises a set of instructions processed by the indexer 130. The algorithm is stored in memory 108. Any one or more of a variety of image data scoring functions may be implemented by various embodiments of the invention. Examples of variables that may be included in an image data scoring function include, without limitation, one or more of the image data that comprises the image data signal.

As described above, an image data signal can be used to determine a rating or score for a particular image, such as an image data score, and this rating or score can reflect the relative likelihood of the image being a representative image of the article of interest. For example, images that are phototype files or otherwise convey a general meaning of the article of interest may receive a higher score than images that are icon-type files or otherwise do not convey a general meaning of the article of interest; thus, in one embodiment, an image type may be used as one or the factor in determining a rating, such as an image data score, for an image. This is but one example, however, and many variables and permutations may be used. This rating or score reflected in the image data signal may be used alone or in combination with other scoring or rating signals to score or rank the image, and to rank and compare groups of images to, for example, identify a representative image for an article.

In another embodiment, the image data signal can be used for comparison against a predefined threshold such as a predetermined criterion. For example, a predetermined criterion can be a requirement for an image with specific dimensions. The image data signal can comprise the dimensions of an image associated with the article of interest, and these dimensions can be compared to the predefined threshold to identify a representative image closest/equal to, above or below, such as a threshold(s). As described above, the image data signal can comprise various signals that may be determined from an image such as file size, frequency across articles, color histogram, or any of the variables and/or image data previously listed. Whether the predefined threshold is met, a determination can be made regarding selecting the particular image as a representative image.

Thus, based on the image data signal, each image can be compared to a predefined threshold such as a predetermined criterion, and the first image that meets the predetermined criterion can be an image with specific dimensions. When an image is determined to have the specific dimensions, then that particular image is selected as the representative image. In this example, the first image determined to have specific dimensions as required by the predefined threshold will be selected as the representative image. In other examples, the first image does not have to be selected, but other images that meet the threshold could be further compared against other predefined thresholds, predetermined criteria, or otherwise scored and ranked by their respective image data signals.

There are a variety of other variables and/or image data that may be included or considered, and these are only examples. Moreover, these and other variables and/or image data may be limited or defined by the image and/or article under consideration, or by other limitations or refinements. Variables, limitations, definitions, or other data associated with image data are generally referred to generally as image data.

In some instances, an article may not have an image associated with the article. In one embodiment, the indexer 130 recognizes these instances, and assigns a null value as an image data signal for the article. In one embodiment, if the indexer 130 determines that there is no image associated with the article, a default image may be identified as a representative image for the article. A default image can include, but is not limited to, a screenshot of the client application when the article is loaded, a "no image available" screen, a predefined section of an article such as the title page of a PDF article, a section of an article such as particular text in a web page, an icon associated with an article (such as a "favicon" for web sites), an icon representing an application program associated with the article, from another article associated with the article of interest (e.g., an article that is linked to/from the article of interest, or an article determined to be related, e.g. topically similar, to the article of interest, etc.) or other information relating to the article, either directly or indirectly, and an icon representing a person associated with the article such as a buddy icon in an instant messaging application or an e-mail.

In some instances, even though an article has an associated image, at least one default image can be selected and assigned a score since the default image could rank higher than any images that exist inside the article. For example, an article that primarily contains text can also contain a small, relatively unimportant image somewhere within the article. In this case, selection of a default image may provide a representative image that is a better representation of the article than the small, relatively unimportant image.

In any event, the representative image, whether a selected image from an article or a default image, is stored by the indexer 130 in the data store 140, repository 146, or other data storage device for subsequent retrieval and use in a result set for a search query. The representative image can be stored by the indexer 130 as a full size image, thumbnail or small image file, or in any format for subsequent display. In most cases, when the representative image is displayed in a result set by the formatter 134, a thumbnail or small image file representing the image or default image appears adjacent to the respective article appearing in the result set for a search query. Other formats for a representative image can be displayed by the formatter 134. In other instances, a representative image could be output or otherwise displayed with a set of selected web pages for a particular user, such as in situations where relatively important web pages for a particular user could be shown to the user without reference to a specific query.

Subroutine 208 is followed by block 210, in which the method 200 ends.

Figure 3:
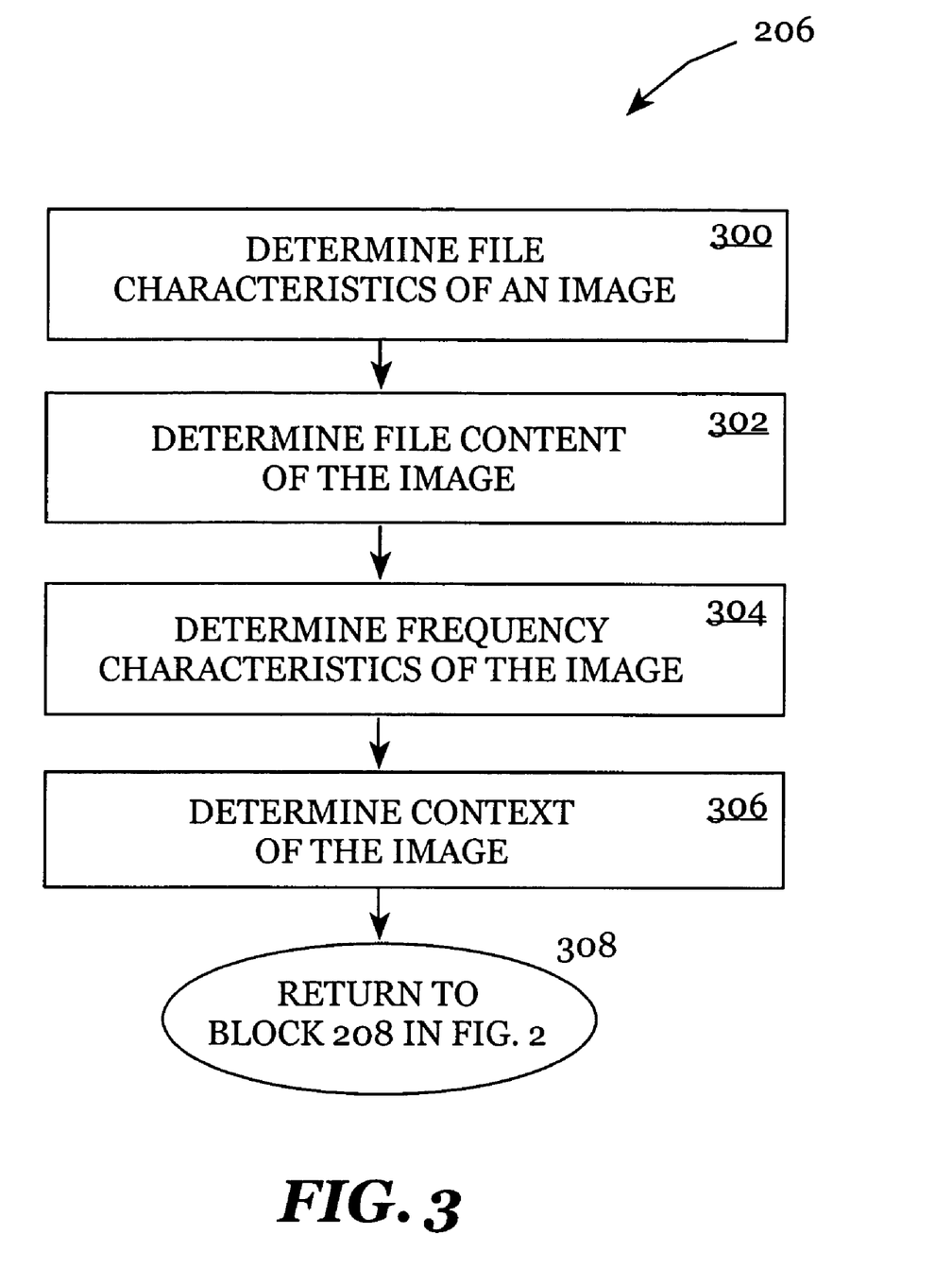
FIG. 3 illustrates a flow diagram of a subroutine of the method shown in FIG. 2.

FIG. 3 illustrates an example of a subroutine 206 for carrying out the method 200 shown in FIG. 2. The subroutine 206 shown determines an image data signal for an image of (or associated with) an article. In the embodiment shown, the order of processing the various image data can be interchanged. In other embodiments, the order of processing can be predetermined or can be interchangeable depending upon the image data processed. Furthermore, in yet other embodiments, the number of images so analyzed may be limited to less than all images received. An example of subroutine 206 is as follows.

Referring to FIG. 3, the example subroutine 206 begins at block 300. At block 300, the indexer 130 determines file characteristics for an image. Examples of file characteristics can include, but are not limited to, file extension name, type of file, file size, image dimension, and image aspect ratio.

For example, the indexer 130 or other component can also determine that an image has a particular file extension name such as ".gif," ".bmp," ".png," ".jpeg," or ".jpg." Other file extension names can be distinguished or otherwise identified by the indexer 130 or other component determining image data. Different formats of image files can also be identified by examining the data in the image, for example, a header in the image file may specify the format of the image.

By way of another example, the indexer 130 or other component can also determine that an image is a particular type of file such as a GIF or JPEG file. In some instances, a GIF file is suited to being a design-type file, and a JPEG or JPG file is suited to being a photo-type file. Other file types can be distinguished or otherwise identified by the indexer 130 or other component determining image data.

In another example, the indexer 130 or other component can also determine that an image is a particular file size as measured in bytes, megabytes, gigabytes, or other unit of data storage measure. In many instances, a relatively large file size is indicative of a photo-type file rather than a design-type file. The file size can be compared to the image dimensions. Often, if two images are of similar dimensions, an image with a larger file size is more likely to be a photo-type image than an icon or design image. This is because photo images often contain more information. The type of compression used in the image file can also be considered in this analysis. Other file sizes can be distinguished or otherwise identified by the indexer 130 or other component determining image data.

In yet another example, the indexer 130 or other component can also determine that an image is a particular image dimension as measured by horizontal pixel count and vertical pixel count, such as a 1020×384. In many instances, a relatively large image dimension is indicative of a photo-type file rather than a design-type file. Other image dimensions can be distinguished or otherwise identified by the indexer 130 or other component determining image data. Certain types of images often occur in standard dimensions, such as advertising banner images. By matching the dimensions of an image with a predetermined list of typical image sizes for a particular type of image, it is often possible to accurately identify the type of image.

As another example, the indexer 130 or other component can also determine that an image has a particular image aspect ratio, such as 3:2. In some instances, an unconventional image aspect ratio such as a 100:1, i.e. a long and skinny image, is indicative of a design-type file rather than a photo-type file. Other image aspect ratios can be distinguished or otherwise identified by the indexer 130 or other component determining image data.

Block 300 is followed by block 302, in which the indexer 130 determines file content for the image. Examples of file content include, but are not limited to, color distribution and number of colors in an image.

For example, the indexer 130 or other component can also determine color distribution in an image. In some instances, a relatively high distribution of color in an image is indicative of a photo-type file rather than a design-type file which may have a relatively lower distribution of color. Other color distribution in an image can be distinguished or otherwise identified by the indexer 130 or other component determining image data.

By way of further example, the indexer 130 or other component can also determine a number of colors in an image. In some instances, a relatively high number of colors in an image is indicative of a photo-type file rather than a design-type file which may have a relatively lower number of colors. Other numbers of colors in an image can be distinguished or otherwise identified by the indexer 130 or other component determining image data.

Block 302 is followed by block 304, in which the indexer 130 determines frequency characteristics for the image. Frequency characteristics can include, but are not limited to, the image frequency over multiple articles.

For example, the indexer 130 or other component can also determine image frequency over multiple articles. A numerical count of the number of times a particular image appears in other articles or within a particular group of articles can be determined or otherwise measured. In some instances, a relatively high image frequency over multiple articles is indicative of a design-type file. Other image frequency measurements can be distinguished or otherwise identified by the indexer 130 or other component determining image data. Image frequency within articles on a particular web site can be useful. For example, an image that appears on a majority of pages on a particular web site may be a navigational image such as a button for jumping to a particular section of the web site, or may be a company logo.

Block 304 is followed by block 306, in which the indexer 130 determines context of the image. Context can include, but is not limited to, location of an image within an article, data adjacent to an image, image caption, and text adjacent to an image.

For example, the indexer 130 or other component can also determine a location of image within an article. In some instances, location of an image at or near the beginning of an article is indicative of a photo-type file rather than a design-type file. In other instances, images positioned at or adjacent to the left top hand corner of an article are likely to be a logo, or design-type or icon-type files. Other locations of an image within an article can be distinguished or otherwise identified by the indexer 130 or other component determining image data.

By way of example, the indexer 130 or other component can also determine data adjacent to an image. Data adjacent to an image, such as text rather than border graphics, is indicative of a photo-type file rather than a design-type file. Other data adjacent to an image can be distinguished or otherwise identified by the indexer 130 or other component determining image data.

In another example, the indexer 130 or other component can also determine an image caption. In many instances, an image caption is indicative that an image is a photo-type file rather than a design-type file. Other image captions can be distinguished or otherwise identified by the indexer 130 or other component determining image data.

As yet another example, the indexer 130 or other component can also determine text adjacent to an image. In many instances, text adjacent to an image is indicative that the image is a photo-type file rather than a design-type file. Other text adjacent to an image can be distinguished or otherwise identified by the indexer 130 or other component determining image data.

The indexer 130 or other component can also determine if the image is associated with the submission of a form by analyzing HTML, XML, or other code associated with the article. Images associated with form submission may be a button such as a "submit" button, which is generally not preferred as a representative image for an article.

Block 306 is followed by block 308, in which an image data signal for a particular image for an article is determined. The indexer 130 can determine an image data signal comprising a score for a particular image in an article. For example, the indexer 130 uses one or a combination of a number of factors, such as file characteristics; the file content; frequency characteristics; and context to determine an image data signal for a particular image in an article. In the embodiment shown, this image data signal is calculated using the data determined in previous blocks 300-306 discussed. In other embodiments, fewer or greater numbers of image data can be processed, and the order of processing blocks 300-306 can be predetermined or can be interchangeable depending upon the image data processed.

In block 310, the subroutine 206 returns to subroutine 208 in FIG. 2, and subroutine 206 ends.

Figure 4:
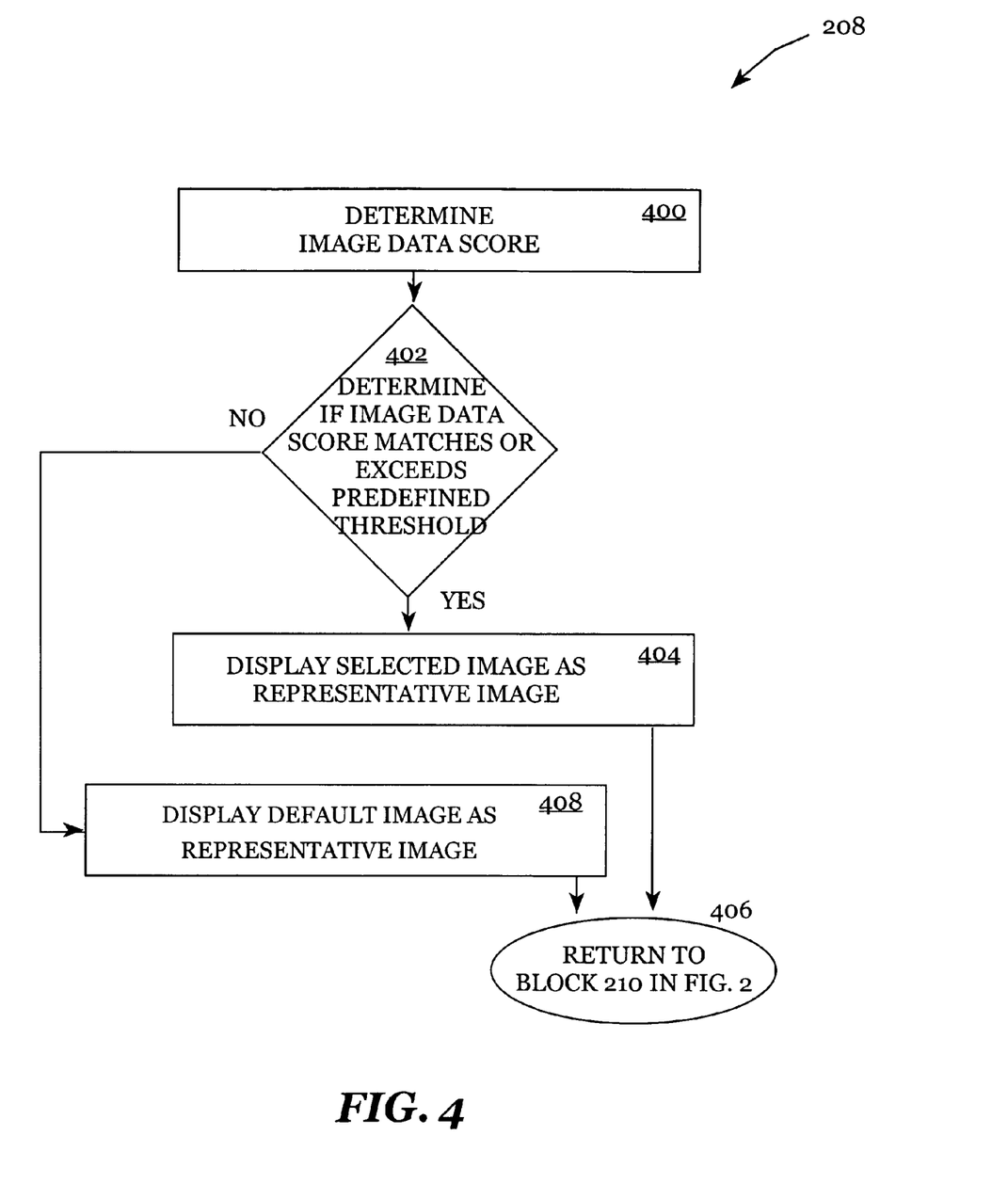
FIG. 4 illustrates a flow diagram of another subroutine of the method shown in FIG. 2.

FIG. 4 illustrates an example of a subroutine 208 for carrying out the method 200 shown in FIG. 2. The subroutine 208 shown determines a representative image for an article based at least in part on an image data signal. An example of subroutine 208 is as follows.

Referring to FIG. 4, the example subroutine 208 begins at block 400. At block 400, the indexer 130 determines a score such as an image data score. In the embodiment shown, the indexer 130 determines an image data score based on the image data signal determined in subroutine 206. In some embodiments, the lowest image data signal may be selected depending upon the values assigned to variables comprising the image data signal.

In one embodiment, an image data score for one or more default images can be determined. In some instances, even though an article has an associated image, at least one default image can be selected and assigned a score since the default image could rank higher than any images that exist inside the article. For example, an article that primarily contains text can also contain a small, relatively unimportant image somewhere within the article. In this case, selection of a default image may provide a representative image that is a better representation of the article than the small, relatively unimportant image.

Block 400 is followed by decision block 402, in which the image data score is compared to a predefined threshold such as a predefined threshold value. If the image data score meets or exceeds the predefined threshold value, then the "YES" branch is followed to block 404. In block 404, the image corresponding to the image data signal is selected as the representative image for the article of interest. The selected image can then be output or otherwise displayed accordingly.

In at least one other embodiment, a plurality of image data scores, including at least one image data score for a default image, are compared against each other to determine a predefined threshold. In this case, the first image data score could be set as the predefined threshold. As each image data score is compared against the first image data score, if a higher image data score is determined, then that higher image data score can be set as the predefined threshold. When all of the image data scores are processed, the image data score that is determined to be the highest of all the image data scores is determined to "meet" the predefined threshold value, and the "YES" branch is followed to block 404. In block 404, the image corresponding to the highest image data score is selected as the representative image for the article of interest. The selected image can then be output or otherwise displayed accordingly. The selected image or a reference to the selected image can be stored for later access. The selected image may be shown associated with a search result, or may be shown alone or in conjunction with additional article information in a set of articles such as a set of frequently accessed or important articles.

Block 404 is followed by block 406, in which the subroutine 208 returns to block 210 in FIG. 2, and the subroutine 208 ends.

Returning to decision block 402, if the image data score does not meet or exceed the predefined threshold value, then the "NO" branch is followed to block 408. In block 408, a default image is selected as the representative image for the article of interest. As described above, the default image can include, but is not limited to, a screenshot of the image, a "no image available" screen, a predefined section of an article such as the title page of a PDF article, an icon representing a person associated with the article such as a buddy icon in an instant messaging application or e-mail. The selected default image can then be displayed accordingly.

Block 408 is followed by block 410, in which the subroutine 208 returns to block 210 in FIG. 2, and the subroutine 208 ends.

While the above description contains many specifics, these specifics should not be construed as limitations on the scope of the invention, but merely as exemplifications of the disclosed embodiments. Those skilled in the art will envision many other possible variations that are within the scope of the invention.

The invention claimed is:

1. A method comprising:
   receiving image data associated with an article of interest, the image data identifying a plurality of images within the article of interest;
   determining a plurality of image data signals for the plurality of images based at least in part on the image data;
   determining a plurality of image data scores for the plurality of images based at least in part on the plurality of image data signals and the article of interest;
   comparing the plurality of image data scores for the plurality of images to a predefined threshold;
   responsive to an image data score for an image being greater than the predefined threshold, selecting the image from within the article of interest as a representative image for the article of interest; and
   responsive to the plurality of image data scores for the plurality of images within the article of interest all being below the predefined threshold:
      determining a second article topically similar to the article of interest;
      selecting a default image from the second article as a representative image for the article of interest; and
      wherein the above are performed by a computer.

2. The method of claim 1, wherein determining a plurality of image data signals comprises identifying at least one image file associated with the article of interest.

3. The method of claim 2, wherein identifying at least one image file associated with the article of interest comprises determining at least one of the following: file extension name, file name, file size, image dimensions, image aspect ratio, image frequency over multiple articles, location of image within an article, data adjacent to image, image caption, text adjacent to image, color distribution in image, text in links to the image from other pages text nearby links to the image from other pages, headings and other text in pages that lint to the image, and number of colors in image.

4. The method of claim 2, wherein the at least one image file comprises at least one of the following: a gif file, a bmp file, a png file, a jpeg file, a jpg file, an image file, photo file, and a screenshot.

5. The method of claim 1, wherein determining a plurality of image data scores for the plurality of images comprises determining an image data score for each of the plurality of images.

6. The method of claim 1, wherein selecting the image from within the article of interest as a representative image for the article of interest comprises selecting an image associated with a highest image data score.

7. The method of claim 6, further comprising:
generating a representative image that includes surrounding context of the image with the highest image data score.

8. The method of claim 1, further comprising:
determining a default image associated with the article of interest; and
determining an image data score for the default image.

9. The method of claim 8, further comprising comparing the image data score for the default image to a predefined threshold.

10. The method of claim 8, wherein the default image is selected from at least one of the following: a screenshot of a client application, a no image available icon, a predefined section of an article, an icon associated with an article, an icon representing an application program associated with the article, an icon representing a person associated with the article, an icon representing a person associated with a messaging application and an icon representing a person associated with an e-mail.

11. The method of claim 1, wherein selecting the image as a representative image for the article of interest comprises selecting an image that meets a predetermined criterion.

12. The method of claim 11, wherein a predetermined criterion comprises at least one of the following: file extension name, file name, file size, image dimensions, image aspect ratio, image frequency over multiple articles, image frequency over multiple articles within a particular web site, location of image within an article, data adjacent to the image, whether the image is associated with submission of a form, image caption, text adjacent to image, color distribution in image, text in links to the image from other pages, text nearby links to the image from other pages, headings and other text in pages that link to the image, and number of colors in image.

13. The method of claim 1, wherein determining a plurality of image data scores for the plurality of images comprises determining a score based on at least one of the following: file extension name, file name, file size, image dimensions, image aspect ratio, image frequency over multiple articles, image frequency over multiple articles within a particular web site, location of image within an article, data adjacent to image, whether the image is associated with submission of a form, image caption, text adjacent to image, color distribution in image, text in links to the image from other pages, text nearby links to the image from other pages, headings and other text in pages that link to the image, and number of colors in image.

14. The method of claim 1, further comprising:
outputting the representative image in a search result associated with the article of interest.

15. The method of claim 14, wherein the search result includes an article associated with a client device and an article associated with a network.

16. The method of claim 14, wherein the search result is in response to at least one of the following: an explicit query from a user, and an implicit query generated by a search engine.

17. The method of claim 1, further comprising:
outputting the representative image associated with the article of interest in a set of selected articles.

18. The method of claim 1, wherein the representative image is selected based at least in part on an article associated with an event.

19. The method of claim 1, wherein the image data score for an image is determined based at least in part on a file name described by an image data signal associated with the image.

20. The method of claim 1, wherein the image data score for an image is determined based at least in part on a file size described by an image data signal associated with the image.

21. The method of claim 1, wherein the image data score for an image is determined based at least in part on a frequency that the image appears over multiple articles.

22. The method of claim 1, wherein the image data score for an image is determined based at least in part on a frequency that the image appears over multiple articles within a particular web site.

23. The method of claim 1, wherein the image data score for an image is determined based at least in part on an aspect ratio of the image.

24. The method of claim 1, wherein the image data score for an image is determined based at least in part on a color distribution in the image.

25. The method of claim 1, wherein the image data score for an image is determined based at least in part on a number of colors in the image.

26. The method of claim 1, wherein the image data score for an image is determined based at least in part on an image caption for the image.

27. A computer program product having a computer-readable storage medium encoded with computer-executable program code, comprising:
program code for receiving image data associated with an article of interest, the image data identifying a plurality of images within the article of interest;
program code for determining a plurality of image data signals for the plurality of images based at least in part on the image data;
program code for determining a plurality of image data scores for the plurality of images based at least in part on the plurality of image data signals and the article of interest;
program code for comparing the plurality of image data scores for the plurality of images to a predefined threshold;
program code for selecting an image from within the article of interest as a representative image for the article responsive to an image data score for the image being greater than the predefined threshold; and
program code for responsive to the plurality of image data scores for the plurality of images within the article of interest all being below the predefined threshold:
determining a second article topically similar to the article of interest; and selecting a default image from the second article as a representative image for the article of interest.

28. The computer program product of claim 27, wherein the program code for determining a plurality of image data signals comprises program code for identifying at least one image file associated with the article of interest.

29. The computer program product of claim 28, wherein the program code for identifying at least one image file associated with the article of interest comprises program code for determining at least one of the following: file extension name, file name, file size, image dimensions, image aspect ratio, image frequency over multiple articles, location of image within an article, data adjacent to image, image caption, text adjacent to image, color distribution in image, text in links to the image from other pages, text nearby links to the image from other pages, headings and other text in pages that link to the image, and number of colors in image.

30. The computer program product of claim 28, wherein the at least one image file comprises at least one of the following: a gif file, a bmp file, a png file, a jpeg file, a jpg file, an image file, a photo file, and a screenshot.

31. The computer program product of claim 27, wherein program code for determining a plurality of image data scores for the plurality of images comprises program code for determining an image data score for each of the plurality of images.

32. The computer program product of claim 27, wherein program code for selecting an image from within the article of interest as a representative image for the article of interest comprises program code for selecting an image associated with a highest image data score.

33. The computer program product of claim 32, further comprising:
    program code for generating a representative image that includes surrounding context of the image with the highest image data score.

34. The computer program product of claim 27, further comprising:
    program code for determining a default image associated with the article of interest; and
    program code for determining an image data score for the default image.

35. The computer program product of claim 34, further comprising program code for comparing the image data score for the default image to a predefined threshold.

36. The computer program product of claim 34, wherein the default image is selected from at least one of the following: a screenshot of the image, a no image available screen, an icon associated with an article, an icon representing an application program associated with the article, an icon representing a person associated with the article, an icon representing a person associated with a messaging application, and an icon representing a person associated with an e-mail.

37. The computer program product of claim 27, wherein the program code for selecting an image from within the article of interest as a representative image for the article comprises program code for selecting an image that meets a predetermined criterion.

38. The computer program product of claim 37, wherein a predetermined criterion comprises at least one of the following: file extension name, file name, file size, image dimensions, image aspect ratio, image frequency over multiple articles, image frequency over multiple articles within a particular web site, location of image within an article, data adjacent to image, whether the image is associated with submission of a form, image caption, text adjacent to image, color distribution in image, text in links to the image from other pages, text nearby links to the image from other pages, headings and other text in pages that link to the image, and number of colors in image.

39. The computer program product of claim 27, wherein the program code for determining a plurality of image data scores for the plurality of images comprises program code for determining a score based on at least one of the following: file extension name, file name, file size, image dimensions, image aspect ratio, image frequency over multiple articles, location of image within an article, data adjacent to image, image caption, text adjacent to image, color distribution in image, text in links to the image from other pages, text nearby links to the image from other pages, headings and other text in pages that link to the image, and number of colors in image.

40. The computer program product of claim 27, further comprising:
    program code for outputting the representative image in a search result associated with the article of interest.

41. The computer program product of claim 40, wherein the search result includes an article associated with a client device and an article associated with a network.

42. The computer program product of claim 40, wherein the search result is in response to at least one of the following: an explicit query from a user, and an implicit query generated by a search engine.

43. The computer program product of claim 27, further comprising:
    program code for outputting the representative image associated with the article of interest in a set of selected articles.

44. The computer program product of claim 27, wherein the representative image is selected based at least in part on an article associated with an event.

* * * * *

UNITED STATES PATENT AND TRADEMARK OFFICE
CERTIFICATE OF CORRECTION

| | |
|---|---|
| PATENT NO. | : 7,580,568 B1 |
| APPLICATION NO. | : 10/813818 |
| DATED | : August 25, 2009 |
| INVENTOR(S) | : Niniane Wang, Stephen R. Lawrence and Christopher M. Prince |

It is certified that error appears in the above-identified patent and that said Letters Patent is hereby corrected as shown below:

Column 17, Claim 3, Line 7, please delete the word "lint" and replace it with --link--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,580,568 B1  Page 1 of 1
APPLICATION NO. : 10/813818
DATED : August 25, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this

Fourteenth Day of September, 2010

David J. Kappos
*Director of the United States Patent and Trademark Office*